3,247,108
DRILLING FLUID
Harry W. Parker, Bartlesville, Okla., assignor to Phillips Petroleum Company, a corporation of Delaware
No Drawing. Filed Feb. 8, 1963, Ser. No. 257,098
12 Claims. (Cl. 252—8.5)

This application is a continuation-in-part of my application, Serial No. 205,126, filed June 25, 1962, now abandoned.

This invention relates to drilling fluids. In another aspect, it relates to drilling fluids of the water base alkaline type used in drilling oil and gas wells, and other deep wells, and to an improved process of drilling such wells with drilling fluids.

In the art of drilling wells to tap subterranean deposits, such as gas or oil, especially when drilling by the rotary method or the percussion method wherein cuttings must be removed from the borehole, it is necessary to use a drilling fluid, as is well known to those skilled in the art. The especially prepared drilling fluid is pumped down a hollow drill string or stem within the borehole, across the drill bit which is attached to the lower end of the drill stem, and is then normally circulated upwardly through the annular space between the drill stem and the borehole. Circulation of the drilling fluid in this manner removes the cuttings from the borehole, lubricates and cools the drill bit, seals the wall of the borehole with a thin, impervious layer of solid material or filter cake, and applies a hydrostatic head to the formation to counterbalance formation pressures.

In addition to having desirable rheological properties such as viscosity and gel strength, it is important that the drilling fluid exhibit a low rate of filtration or fluid loss, that is, the drilling fluid should permit little if any loss of its liquid phase to the formation penetrated, as is well known to those skilled in the art.

The drilling fluid also has an effect on the friction between the drill stem and the borehole, and the higher the coefficient of friction between the drill pipe and the formation being drilled, that is, the lower the degree of lubricity of the drilling fluid, the greater the power requirements needed to manipulate the drill stem in the borehole filled with drilling fluid. Further, a drilling fluid having a low degree of lubricity means that a greater drag on the drill stem will result, thereby lessening the useful life of the drill stem. So, it is becoming increasingly important to those skilled in the art to consider the lubricating properties of the drilling fluid, not only in regard to the wearing of the bearings in the drill bit, but also with respect to the friction between the drill stem and borehole.

Many different materials or additives have been proposed, patented, or used heretofore for imparting to drilling fluids various improved properties, particularly to lower the filtration or water loss of such drilling fluids, and, recently, to improve the lubricating properties of the drilling fluid. However, many of these materials are unsatisfactory or result in only a minimum degree of improvement, while others are prohibitively expensive to manufacture or require usage in prohibitively large amounts.

Accordingly, an object of this invention is to provide an improved drilling fluid of the water base type. Another object is to provide an improved method of drilling oil and gas wells, or other deep wells, using an improved water base drilling fluid, particularly a water base alkaline drilling fluid. Another object is to provide an improved drilling fluid additive which imparts to drilling fluids treated therewith improved properties, such as lower filtration rate or water loss and/or high degree of lubricity, which additive can be obtained from relatively inexpensive, readily available materials. Further objects and advantages of this invention will become apparent to those skilled in the art from the following discussion and appended claims.

I have now discovered that superior drilling fluids of the water base type, particularly water base alkaline drilling fluids, can be prepared by adding to a fluid carrier comprising water, water and clay, or an emulsion of oil in water, an additive comprising sewage sludge.

Sewage sludge comprises organic material obtained from the water-carried waste of households or municipalities. It is this sewage sludge that I propose to employ as an additive for water base alkaline drilling fluids. The sewage sludge can be prepared by the action of air and aerobic bacteria on such organic materials, a widely used process of this type being the activated sludge process, or by the action of anaerobic bacteria as in the case of the sludge digestion process. Unless otherwise qualified, the term sewage sludge is used herein to mean sewage sludge prepared by either of such process, i.e., in the generic sense to cover both activated sewage sludge and digested sludge.

The sewage sludge per se can be dispersed in the aqueous carrier of the drilling fluid, or it can be preliminarily treated with a dilute mineral acid or an aqueous alkali solution, the treated sewage sludge or certain fractions of such treated sewage sludge then being dried, pulverized and dispersed in the carrier, or the sewage sludge can be oxidized. The sewage sludge prepared by municipalities is generally obtained in a dry, pulverulent form (and often used in this form as a fertilizer) or it can be obtained and used in this invention in its wet form, thus obviating the need for drying it at the sewage plant. A sewage sludge of this type is Milorganite (comprising 5–10% water, 6.5–7.5% $NH_3$, 2.5–3.5% $P_2O_5$, 3–4% total $H_3PO_4$), an activated sewage sludge. Sand, which usually is present in sewage sludge, e.g., in the amount of 20 percent, can be removed by dispersing the sewage sludge in the sewage sludge in alkaline water in the form of a slurry and then centrifuging the slurry to recover the top or overflow liquid phase.

I have found that when sewage sludge, or one of its acid or alkali treated forms or in its oxidized form, is added to water per se, or a water base drilling fluid that has an acid pH, it does not sufficiently disperse, dispersibility being an essential requirement of any drilling additive, and thus does not improve the filtration rate. However, when such material is added to an alkaline solution, such as a water base alkaline drilling fluid, it readily disperses and imparts desirable properties to the drilling fluid, particularly low water loss and enhanced lubricity. The sewage sludge per se can be dispersed in water whose pH has been adjusted to render it alkaline, for example, by the addition of caustic. On the other hand, according to another aspect of this invention, the sewage sludge can be treated with dilute (e.g., 5 to 50 percent concentration) mineral acid, such as hydrochloric, sulfuric or nitric acid, at somewhat elevated temperatures for a suitable time, for example, at 100 to 200° F. and 1 to 24 hours. The so acid-treated sewage sludge can then be neutralized with an alkali, such as sodium hydroxide, dried, and recovered as a solid which is then pulverized for use. Alternatively, after treatment of sewage sludge with dilute acid, the mixture can be filtered to obtain an acid filtrate and an acid insoluble filter cake. Both of these materials can be treated with an aqueous alkali solution, for example, at 100 to 200° F for 1 to 24 hours, and then dried and pulverized. In the case of the acid filtrate, after treatment with the alkali, and drying, an acid soluble solid is obtained which can be dispersed in the drilling fluid carrier, particularly to improve lubricity. In the case of the acid insoluble filter cake, after treating the same with alkali, for example, at said elevated temperatures for a suitable period of time, an acid insoluble solid is obtained which similarly can be pulverized and dispersed in the carrier of the drilling fluid. It is also possible according to a further aspect of this invention merely to treat the sewage sludge with an alkali, for example, at elevated temperatures of 100 to 200° F. and 1 to 24 hours or longer, dry the so-treated sewage sludge, and pulverize the same for dispersion in the carrier of the drilling fluid. Where the sewage sludge has been treated with an alkali such as caustic, it may render the water sufficiently alkaline so that no adjustment of the pH is necessary. pH's in the range of 9–11 are preferred.

By the term "alkali," as used in the specification and the appended claims, I mean generically to cover the alkali metal salts, oxides, hydroxides and carbonates, such as sodium hydroxide, sodium carbonate, potassium hydroxide and potassium carbonate. I prefer to employ as an alkali that of sodium carbonate or sodium hydroxide. The amount of alkali employed in treating the sewage sludge can vary over a wide range, and aqueous solutions of such alkali having concentrations in the range of 5 to 50 percent will generally be useful, although concentrations outside of these ranges can be used.

As mentioned above, it is also within the scope of this invention to employ oxidized sewage sludge as an additive for water base alkaline drilling fluids. For this purpose, I prefer to oxidize activated sewage sludge with an oxidizing agent such as hydrogen peroxide, sodium peroxide, oxygen, nitric acid, sodium or potassium chromate, chromic acid, and the like. The amount of oxidizing agent used can vary, but stated functionally the amount will be that sufficient to produce an oxidized sewage sludge product which will decrease the water loss of drilling fluids treated therewith. In the case of hydrogen peroxide (the preferred oxidizing agent), usually about 0.01 to 0.1 gram of hydrogen peroxide (100%) per gram of sewage sludge will be adequate with about 0.015 gram of hydrogen peroxide per gram of sewage sludge being typical. The oxidizing treatment of the sewage sludge can vary in time and temperature, but generally about 1 to 20 hours, preferably 3 to 10 hours, and 150 to 270° F., preferably 170 to 220° F., will be satisfactory. The oxidizing treatment is exothermic and is carried out in an alkaline water solution with pH's of 10 or higher being preferred, using a base such as sodium hydroxide to obtain the alkaline pH. Usually, in the case of hydrogen peroxide, about 0.15 gram of caustic per gram of sewage sludge will give a solution with a pH of 10 or higher.

The oxidized sewage sludge not only results in lowering the water loss of drilling fluids made up with fresh water, but lowers the water loss of drilling fluids made up with salt water or even saturated salt water. Where clays are used with salt water drilling fluids containing the oxidized sewage sludge of this invention, I prefer to use such clays in low levels, generally not exceeding 20 pounds per barrel of drilling fluid, since high levels of clay increase the water loss.

The drilling fluids of this invention can be prepared in the field in any conventional manner. The amount of sewage sludge or one of its derivatives used will be dependent upon several variables, such as the particular nature of the sewage sludge, the density of the drilling fluid desired, the nature of the formations drilled with such drilling fluid, the presence of other materials in the drilling fluid, such as clay, etc. It has long been customary in well drilling operations to subject the drilling fluid to simple routine tests from time to time and these tests will be sufficient to indicate to those skilled in the art the desirable amount of sewage sludge to be used to improve the properties of the drilling fluid, particularly water loss and lubricity. Generally, the amount of sewage sludge or derivative thereof to be employed will be, stated functionally, sufficient to improve the properties of the drilling fluid, that is lower the normal filtration rate of the carrier of the drilling fluid, and/or enhance the degree of lubricity of the carrier of the drilling fluid. In most applications, the amount of sewage sludge or derivative thereof to be used will be in the range from about 0.1 to 20 pounds per pound (42 U.S. gallons), preferably 1 to 15 pounds per barrel.

For oil-in-water emulsions, the amount of water can also vary and will be in the range from 99 to 60 percent by weight of the final emulsion, with the amount of oil being in the range of 1 to 40 percent of emulsion. The oil component used in preparing these emulsion drilling fluids can be any hydrocarbons normally used for this purpose in the art such as diesel oil, crude oil, kerosene, gas oil, heavy cycle oil, various petroleum fractions and the like. For such emulsion systems, any suitable conventional emulsifying agent can be used if desired, such as the alkaline earth metal salts of saponifiable oils, such as vegetable oils, wood oils, fish oils, and the like. Other applicable emulsifying agents include Dresinates, alkali and alkaline earth salts of lignin, alkali metal and ammonium salts of carboxymethylcellulose, etc. In general, the emulsion drilling products prepared according to this invention are relatively stable tight emulsions.

In addition, it may be desirable to add to or have present in the drilling fluids of this invention the usual clay solids such as illites, e.g., McCracken Clay, montmorillonite, e.g., bentonite, kaolin, attapulgite, etc., or other finely divided inorganic solids, although the sewage sludge additive of this invention can be used to supplant part or all of the clay solids normally added to such water based drilling fluids. In addition, materials commercially used for weighing purposes can be added, including finely divided limestone, barite, lead sulfide, oyster shell, and the like. It is also within the scope of this invention to also add, in addition to the sewage sludge, other known additives for improving the properties of such drilling fluids, for example, sulfonated asphalt ("Soltex") as disclosed and claimed in U.S. 3,028,333 issued April 3, 1962, to Charles A. Stratton et al.; for example, sulfonated asphalt in the amount of 0.1 to 100 weight percent or more of the sewage sludge additive can be added to the drilling fluid together with the sewage sludge, so as to obtain the benefits from each additive. Either activated, digested or oxidized sewage sludge can be admixed with the sulfonated asphalt. A preferred method of providing a mixture of the sewage sludge and sulfonated asphalt is to neutralize the sulfonic acids of asphalt (during the preparation of sulfonated asphalt as disclosed in U.S. 3,028,333) with an alkaline dispersion of the sewage sludge, which may be used in its wet form, as it comes from the filters in the sewage plant, or by admixing dried sewage sludge with the aqueous alkaline neutralizing medium. The so-neutralized mixture can then be dried and pulverized. Alternatively, the sewage sludge and sulfonated asphalt material can be dry blended.

In addition, I have found that the use of starch in combination with oxidized sewage sludge is effective in lowering the water loss of salt water drilling fluids, and for this purpose 0.1 to 10 pounds of starch per barrel of drilling fluid can be used. Materials such as sodium carboxymethylcellulose, hydrolyzed polyacrylonitrile, sulfonated phenol-formaldehyde polymer, etc., can also be used in conjunction with the sewage sludge or derivatives thereof.

The following examples further illustrate the objects and advantages of this invention, but it should be understood that the various materials, amounts and other details of these examples are merely illustrative of preferred embodiments and should not be construed to limit unduly this invention.

*Example I*

Dried sewage sludge, from the city of Houston, Texas, in the amount of 318 g. was treated with 1500 ml. of 20% hydrochloric acid for 24 hrs. at 203° F. The mixture was then filtered, and the acid insoluble filter cake washed with distilled water to remove the acid. A 75 g. portion of the dried filter cake was then treated for 3 hrs. at 185° F. with an aqueous alkali solution comprising 10 g. of sodium hydroxide and 750 ml. of water. The neutralized mixture was then dried and crushed to a powder, this material hereinafter referred to as acid treated, acid insoluble, neutralized sewage sludge. Its ability to improve the properties of a water base alkaline drilling fluid are reported in Examples VI and VII.

*Example II*

In this example, the filtrate obtained by filtering the acid treated sewage sludge of Example I, together with the first wash water, was heated to reduce its volume from 3000 ml. to 800 ml. Sodium hydroxide in the amount of 85 g. was then added to the resulting acid solution, after which the solution was evaporated to dryness and crushed to a powder, the material obtained hereinafter referred to as acid treated, acid soluble, neutralized sewage sludge. Its ability to improve the lubricity of a water base alkaline drilling fluid is set forth in Example VII.

*Example III*

Activated sewage sludge from the city of Houston, Texas, in the amount of 400 g. was treated for 24 hrs. at 170–190° F. with an alkali solution comprising 60 g. of sodium hydroxide and 1200 ml. of water. The resulting alkali solution was then evaporated to dryness and crushed to a powder, the material obtained hereinafter referred to as caustic treated sewage sludge "H." Its ability to improve the properties of a water base alkaline drilling fluid is set forth in Examples VI and VII.

*Example IV*

In this example, 400 g. of Milorganite, a commercial sewage sludge from the city of Milwaukee, Wisconsin, was treated for 27 hrs. at 180° F. with an alkali solution comprising 60 g. of sodium hydroxide in 2000 ml. of water. The alkali solution was evaporated to dryness and pulverized, the material obtained hereinafter referred to as caustic treated sewage sludge "M." Its ability to lower the water loss of a water base alkaline drilling fluid is set forth in Example VI.

*Example V*

In this example, 400 g. of Milorganite was treated for 24 hrs. at 180° F. with an alkali solution comprising 80 g. of sodium carbonate in 2000 ml. of water, the alkali solution was evaporated to dryness, the dried solid pulverized, and this mineral is hereinafter referred to as carbonate treated sewage sludge. Its ability to improve the properties of a water base drilling fluid is described in Example VI.

*Example VI*

In this example, a number of water base drilling fluids were prepared and to the same were added various amounts of the sewage sludge additives of this invention. In some of these drilling fluids, an alkaline pH was obtained by adding NaOH. The water loss or filtration rate of these drilling fluids were determined according to API Recommended Practices 29, May 1957. A summary of the composition of these drilling fluids and the water loss results obtained are set forth in Table I. For purposes of comparison, other drilling fluids of the water base type were prepared and evaluated as controls; the compositions of the control drilling fluids and the results obtained are also set forth in Table I.

The results set forth in Table I clearly illustrate the superior nature of those drilling fluids containing the sewage sludge additive of this invention. Not only did the additives of this invention improve the water loss characteristics of the drilling fluids, but also such additives did not adversely affect the rheological properties of the drilling fluids such as viscosity and gel strength. Note also that the presence of contaminants in the drilling fluid, such as $CaSO_4$ and NaCl, did not interfere with the ability of the sewage sludge to improve the properties of the drilling fluid. Further, that in the case of emulsion drilling fluids, where diesel oil was used, the absence of oil in the filtrate indicates a tight emulsion.

TABLE I

| Run | Drilling fluid composition | | | | | | | Water loss b (ml.) |
|---|---|---|---|---|---|---|---|---|
| | Water (ml.) | Diesel oil (ml.) | McCracken clay (g.) | $CaSO_4 \cdot 2H_2O$ (g.) | NaCl (g.) | Sewage sludge (g.) | pH a | |
| Controls (no sewage sludge added) | | | | | | | | |
| 1 | 350 | 0 | 50 | 0 | 0 | 0 | 6.1 | 96 |
| 2 | 350 | 0 | 50 | 0 | 0 | 0 | 10.1 | 115 |
| 3 | 350 | 0 | 50 | 0 | 0 | 0 | 11.1 | 113 |
| Untreated sewage sludge | | | | | | | | |
| 4 | 350 | 0 | 50 | 0 | 0 | 12 | 5 | 91 |
| 5 | 350 | 0 | 50 | 0 | 0 | 12 | 8.5 | 55 |
| 6 | 350 | 0 | 50 | 0 | 0 | 12 | 11.8 | 13.8 |
| 7 | 350 | 0 | 50 | 0 | 0 | 12 | 12.4 | 15.1 |
| 8 | 350 | 15 | 0 | 0 | 0 | 12 | 12.1 | c 6.8 |
| 9 | 350 | 0 | 0 | 0 | 0 | 12 | 12 | 11 |
| Acid treated, acid insoluble, neutralized sewage sludge | | | | | | | | |
| 10 | 350 | 0 | 50 | 0 | 0 | 3 | 11.1 | 50 |
| 11 | 350 | 0 | 50 | 0 | 0 | 6 | 9.5 | 29.4 |
| 12 | 350 | 0 | 50 | 0 | 0 | 6 | 10.5 | 29.4 |
| 13 | 350 | 0 | 50 | 0 | 0 | 6 | 11.2 | 30 |
| 14 | 350 | 0 | 50 | 0 | 0 | 12 | 11.2 | 12.8 |

Caustic treated sewage sludge "H"

| | | | | | | | | |
|---|---|---|---|---|---|---|---|---|
| 15 | 350 | 0 | 50 | 0 | 0 | 6 | 8.6 | 43.8 |
| 16 | 350 | 0 | 50 | 0 | 0 | 6 | 11.3 | 19 |
| 17 | 350 | 0 | 50 | 0 | 0 | 9 | 8.8 | 18.4 |
| 18 | 350 | 0 | 50 | 0 | 0 | 9 | 11.1 | 11.2 |
| 19 | 350 | 0 | 50 | 0 | 0 | 12 | 9 | 11.6 |
| 20 | 350 | 0 | 50 | 0 | 0 | 12 | 11.1 | 10.2 |
| 21 | 350 | 0 | 0 | 0 | 0 | 12 | 10.8 | 11.2 |
| 22 | 350 | 0 | 0 | 0 | 0 | 24 | 10.9 | 6.2 |
| 23 | 350 | 0 | 50 | 1 | 0 | 12 | 8.8 | 19 |
| 24 | 350 | 0 | 50 | 1 | 0 | 12 | 11.1 | 16 |
| 25 | 350 | 0 | 50 | 0 | 15 | 12 | 8.8 | 26 |
| 26 | 350 | 0 | 50 | 0 | 15 | 12 | 11.1 | 23.8 |
| 27 | 350 | 15 | 50 | 0 | 0 | 12 | 10.9 | c 6 |

Caustic treated sewage sludge "M"

| | | | | | | | | |
|---|---|---|---|---|---|---|---|---|
| 28 | 350 | 0 | 50 | 0 | 0 | 6 | 10.1 | 26.4 |
| 29 | 350 | 0 | 50 | 0 | 0 | 12 | 10.2 | 12 |

Carbonate treated sewage sludge

| | | | | | | | | |
|---|---|---|---|---|---|---|---|---|
| 30 | 350 | 0 | 50 | 0 | 0 | 6 | 10.6 | 24.8 |
| 31 | 350 | 0 | 50 | 0 | 0 | 12 | 10.3 | 13 | a In runs with alkaline pH's, if sewage sludge additive did not impart desired degree of alkalinity, NaOH was added to effect same.
b Water loss is given as number of ml. collected in 30 min. at room temperature.
c In these emulsion drilling fluids, filtrate obtained did not contain any oil.

Example VII

In this example, the ability of the additives of this invention to enhance the lubricating properties of the water base alkaline drilling fluids is demonstrated. Water base alkaline drilling fluids containing 12.5 wt. percent McCracken Clay were prepared containing various amounts of the additives of this invention. The lubricity of such drilling fluids was determined in a Shell Four-Ball Extreme Pressure Lubricant Tester, made by the Precision Scientific Company, using three glass balls with one steel ball rotating against them. The coefficient of friction measured for each of these drilling fluids according to this technique at various loads are set forth in Table II.

Example VIII

The sewage sludge additive of this invention also has the ability to thin clay-containing water base alkaline drilling fluids, as demonstrated in the example.

A number of water base alkaline drilling fluids containing bentonite were prepared, and to some of these the sewage sludge additive prepared according to Example I was added. Certain properties of these drilling fluids were then determined in a Model 35 Fann V-G Meter according to API Recommended Practices, May 1957. Results are set forth in Table III.

TABLE II

| Run | Amt. of additive (lbs./bbl.) | Coefficient of friction a Load (kg.) | | | | | |
|---|---|---|---|---|---|---|---|
| | | 6 | 12 | 18 | 24 | 30 | 36 |

Control (no sewage sludge)

| | | | | | | | |
|---|---|---|---|---|---|---|---|
| 1 | 0 | 0.40 | 0.57 | 0.57 | | | |

Untreated sewage sludge

| | | | | | | | |
|---|---|---|---|---|---|---|---|
| 2 | 3 | 0.22 | 0.48 | 0.52 | 0.52 | 0.39 | 0.38 |

Acid treated, acid insoluble, neutralized sewage sludge

| | | | | | | | |
|---|---|---|---|---|---|---|---|
| 3 | 6 | 0.19 | 0 | 0.14 | 0.002 | 0.02 | 0.03 |

Acid treated, acid soluble, neutralized sewage sludge

| | | | | | | | |
|---|---|---|---|---|---|---|---|
| 4 | 6 | 0 | 0 | 0 | 0 | 0 | 0 |

Caustic treated sewage sludge "H"

| | | | | | | | |
|---|---|---|---|---|---|---|---|
| 5 | 0.25 | 0.28 | 0.38 | 0.38 | 0.43 | 0.34 | 0.28 |
| 6 | 0.5 | 0.67 | 0.27 | 0.38 | 0.47 | 0.39 | 0.37 |
| 7 | 1 | 0.32 | 0.03 | 0 | 0.52 | 0.36 | 0.32 |
| 8 | 3 | 0 | 0 | 0 | 0 | 0.01 | 0.01 |
| 9 | 6 | 0 | 0 | 0.02 | 0.02 | 0.05 | 0.03 |
| 10 | 12 | 0 | 0 | 0.02 | 0.01 | 0.05 | 0.07 | a Coefficient of friction values reported as "0" do not mean that the sample had no coefficient of friction, but rather that the value was so low that it could not be read on the scale of the tester.

TABLE III

| Amt. of bentonite, lbs./bbl. | Amt. of sewage sludge, lbs./bbl. | pH of drilling fluid | Gels, 0/10 min. lbs./100 ft.² | Apparent viscosity, cp. | Plastic viscosity, cp. | Yield point, lbs./100 ft.² |
|---|---|---|---|---|---|---|
| 11 | 0 | 11.1 | 35/50 | 20 | 7 | 25 |
| 11 | 3 | 11.7 | 0/0 | 4 | 3 | 1 |
| 22 | 0 | 11 | (a) | (a) | (a) | (a) |
| 22 | 3 | 10.1 | 3/12 | 23 | 18 | 9 |
| 22 | 3 | 11.6 | 7/70 | 30 | 23 | 14 | a Too thick to measure.

The data of Table III indicate that the sewage sludge additive is highly effective in thinning a bentonite-containing drilling fluid, as evidenced by the relatively lower gels, apparent viscosity, plastic viscosity, and yield point.

*Example IX*

In this example, a plurality of runs were made in which Milorganite sewage sludge was oxidized to prepare dry, pulverulent oxidized sewage sludge for use in drilling fluids. In each run, 400 g. of the sewage sludge in 2000 ml. of water (made alkaline with NaOH) were treated with a 30% solution of $H_2O_2$ and the treated solution was heated to dryness. Table IV summarizes these runs.

TABLE IV

| Run | $H_2O_2$ (100%), g. per g. of sludge | NaOH, g. per g. of sludge | Max. temp., °F. | Heating time, hrs. |
|---|---|---|---|---|
| 1 | 0.0214 | 0.15 | 200 | 3 |
| 2 | 0.0214 | 0.15 | 170 | 3 |
| 3 | 0.014 | 0.2 | 170 | 4 |
| 4 | 0.082 | 0.15 | | |
| 5 | 0.082 | 0.15 | 130 | 3 |
| 6 | 0.0214 | 0.15 | 150 | 3 |

In Runs 1–3 and 6, a vacuum oven was used to heat the solution to dryness, whereas an infrared lamp was used followed by a vacuum oven in run 4, and a drum drier was used in run 5.

*Example X*

In this example, 40 g. of Milorganite in 150 ml. of water was treated with 10 ml. of concentrated $HNO_3$. After 10 min. on a hot plate (100° F.), the mixture was heated about 2½ hrs. at 150° F. to evaporate about ½ of the water. Solution was then made basic (pH 8) by adding a caustic water solution, and the solution then dried in a vacuum oven at 70° C. to obtain a dry oxidized sewage sludge.

*Example XI*

The oxidized sewage sludges prepared by Examples IX and X were evaluated as water loss control agents in various drilling fluids, according to API Code 29. A summary of these drilling fluids and the results obtained are set forth in Table V.

TABLE V

| Run | Drilling fluid composition | | | | | | Water loss [b] (ml.) |
|---|---|---|---|---|---|---|---|
| | Water (ml.) | McCracken clay (g.) | $CaSO_4 \cdot 2H_2O$ (g.) | NaCl (g.) | Oxidized sewage sludge (g.) | pH [a] | |
| 1 | 350 | 0 | 0 | 0 | 12 (run 1 of Ex. IX) | 10.6 | 12.0 |
| 2 | 350 | 0 | 1 | 0 | do | 10.0 | 11.6 |
| 3 | 350 | 0 | 0 | sat.[c] | do | 10.0 | 10.4 |
| 4 | 350 | 0 | 1 | sat. | do | 10.2 | 19.4 |
| 5 | 350 | 0 | 0 | 0 | 12 (run 2 of Ex. IX) | 10.8 | 11.2 |
| 6 | 350 | 0 | 1 | 0 | do | 10.2 | 11.2 |
| 7 | 350 | 0 | 0 | sat. | do | 10.2 | 9.2 |
| 8 | 350 | 0 | 1 | sat. | do | 10.2 | 18.4 |
| 9 | 350 | 0 | 0 | 0 | 12 (run 3 of Ex. IX) | 11.6 | 11.4 |
| 10 | 350 | 0 | 1 | 0 | do | 11.4 | 10.4 |
| 11 | 350 | 0 | 0 | sat. | do | 10.3 | 33 |
| 12 | 350 | 0 | 1 | sat. | do | 10.8 | 10.6 |
| 13 | 350 | 0 | 0 | sat. | 6 (run 4 of Ex. IX) | 10.1 | 16 |
| 14 | 350 | 0 | 0 | sat. | 12 (run 4 of Ex. IX) | 10.4 | 9.8 |
| 15 | 350 | 0 | 0 | sat. | 18 (run 4 of Ex. IX) | 10.4 | 9.8 |
| 16[d] | 350 | 0 | 0 | 0 | 12 (run 4 of Ex. IX) | 10.4 | 5.2 |
| 17[e] | 350 | 0 | 0 | 0 | do | 10.4 | 8.6 |
| 18[f] | 350 | 0 | 0 | 0 | do | 10.4 | 5.4 |
| 19 | 350 | 0 | 0 | 0 | do | 11.2 | 12.8 |
| 20 | 350 | 0 | 0 | 10 | do | 11.0 | 11.6 |
| 21 | 350 | 0 | 0 | 20 | do | 10.9 | 11.0 |
| 22 | 350 | 0 | 0 | sat. | do | 9.7 | 10.0 |
| 23 | 350 | 0 | 0 | 0 | 12 (run 5 of Ex. IX) | 10.4 | 9.8 |
| 24 | 350 | 0 | 1 | 0 | do | 10.8 | 10.4 |
| 25 | 350 | 0 | 0 | sat. | do | 10.2 | 16 |
| 26 | 350 | 0 | 1 | sat. | do | 10.3 | 34.4 |
| 27 | 350 | 0 | 0 | sat. | do | 7.5 | 17.4 |
| 28 | 350 | 0 | 0 | sat. | do | 8.2 | 18.2 |
| 29 | 350 | 0 | 0 | sat. | do | 9.0 | 16.4 |
| 30 | 350 | 0 | 0 | sat. | do | 10.1 | 23.4 |
| 31 | 350 | 0 | 0 | sat. | do | 8.8 | 12.6 |
| 32 | 350 | 0 | 0 | sat. | do | 7.7 | 12.6 |
| 33 | 350 | 0 | 0 | sat. | do | 9.2 | 11.4 |
| 34 | 350 | 50 | 0 | 0 | do | 10.3 | 8.2 |
| 35 | 350 | 50 | 0 | 10 | do | 10.3 | 23.2 |
| 36 | 350 | 50 | 0 | sat. | do | 10.1 | 61 |
| 37 | 350 | 0 | 0 | 0 | 12 (run 6 of Ex. IX) | 10.9 | 10.2 |
| 38 | 350 | 0 | 1 | 0 | do | 10.4 | 10.4 |
| 39 | 350 | 0 | 0 | sat. | do | 10.5 | 8.0 |
| 40 | 350 | 0 | 1 | sat. | do | 10.7 | 15.2 |
| 41 | 350 | 0 | 0 | 0 | 12 (Ex. X) | 11.5 | 17 |
| 42 | 350 | 0 | 0 | 10 | do | 11.0 | 17 | a In runs with alkaline pH's, if sewage sludge additive did not impart desired degree of alkalinity, NaOH was added to effect same.
b Water loss is given as number of ml. collected in 30 min. at room temperature.
c "sat." indicates drilling fluid was saturated with NaCl.
d The drilling fluid in this run also contained 15 ml. of diesel oil, and the filtrate obtained did not contain any oil.
e The drilling fluid in this run also contained 0.5 g. of med. vis. Driscose (sodium carboxymethylcellulose).
f The drilling fluid in this run also contained 3 g. of starch.

The results set forth in Table V clearly demonstrate the efficacy of oxidized sewage sludge as a water loss control agent for water base alkaline drilling fluids, notwithstanding the presence of NaCl and/or $CaSO_4$.

*Example XII*

As mentioned above, oxidized sewage sludge can be used in conjunction with starch in salt water drilling fluids to control water loss. In Runs 1 and 2, the oxidized sewage sludge used was that prepared according to Run 5 of Example IX, and that used in Runs 3 and 4 was that of Run 4 of Example IX. In each of the runs, sufficient NaOH was added to render the drilling fluid alkaline. Water loss was determined according to API Code 29. This is demonstrated by the following data in Table VI.

TABLE VI

| Run | Water (ml.) | Oxidized sewage sludge (g.) | Starch (g.) | pH | Water loss (ml.) |
| --- | --- | --- | --- | --- | --- |
| 1 | 350 | 12 | 0 | 10.7 | 22.2 |
| 2 | 350 | 12 | 3 | 10.5 | 8.8 |
| 3 | 350 | 12 | 0 | 10.4 | 9.8 |
| 4 | 350 | 12 | 3 | 10.4 | 5.4 |

*Example XIII*

Dry, digested sewage sludge, obtained from the city of Bartlesville, Oklahoma, was evaluated in this example as a water loss control agent for water base drilling fluids, the efficacy of this agent being shown by the data in Table VII below. Again, sufficient NaOH was used to render the drilling fluid alkaline, and the procedure of API Code 29 was used to determine water loss.

TABLE VII

| Run | Water (ml.) | McCracken clay (g.) | Digested sewage sludge (g.) | pH | Water loss (ml.) |
| --- | --- | --- | --- | --- | --- |
| 1 | 350 | 0 | 12 | 11.4 | 26 |
| 2 | 350 | 50 | 12 | 10.8 | 16.2 |

*Example XIV*

As mentioned above, sand present in sewage sludge can be removed therefrom to improve the water loss control properties of the sewage sludge. Such removal of sand also contributes the economics of this invention, since savings can thus be realized in shipping and the lower amount of the agent necessary to be desirable reduction in water loss. The advantages of sand removal are illustrated in this example, using for this purpose Milorganite. This sewage sludge was dispersed in alkaline water in the form of a slurry, which was then centrifuged to remove settled material comprising sand from a top or overflow liquid phase containing the relatively sand-free dispersed sewage sludge. The water loss of the separated liquid phase (containing about 12 lbs. of sewage sludge per barrel) and a dispersion of the settled phase (containing about 2.4 lbs. of settled cake per barrel) as well as a non-centrifuged control dispersion of the sewage sludge, was determined according to API Code 29 and results are set forth in Table VIII below, sufficient NaOH being added to the samples to render the same alkaline.

TABLE VIII

| Run | Material | McCracken clay (g.) | pH | Water loss (ml.) |
| --- | --- | --- | --- | --- |
| 1 | Non-centrifuged sewage sludge sludge dispersion. | 0 | 11.2 | 10.3 |
| 2 | do | 50 | 11.5 | 12.8 |
| 3 | Overflow from centrifuged sewage sludge. | 0 | 10.5 | 8.8 |
| 4 | do | 50 | 10.1 | 9.6 |
| 5 | Dispersion of settled cake from centrifuged sewage sludge. | 0 | 10.5 | 80.0 |
| 6 | do | 50 | 10.3 | 14.6 |

Various modifications and alterations will become apparent to those skilled in the art without departing from the scope and spirit of this invention and it should be understood that this invention is not to be limited to that set forth herein for illustrative purposes.

I claim:

1. A water base alkaline drilling fluid comprising water and an amount of sewage sludge selected from the group consisting of activated sewage sludge and digested sewage sludge sufficient to improve the viscosity, gel strength, and fluid loss properties of the drilling fluid, said drilling fluid having a pH in the range of about 8.5 to 11.5.

2. A water base alkaline drilling fluid comprising water and an additive selected from the group consisting of activated sewage sludge, digested sewage sludge and derivatives thereof prepared by treating with one of an oxidizing agent, an alkali solution, and a dilute mineral acid followed by neutralization with an alkali solution, said additive being present in an amount sufficient to improve the viscosity, gel strength and fluid loss properties of the drilling fluid, said drilling fluid having a pH in the range of about 8.5 to 11.5.

3. A water base alkaline drilling fluid according to claim 2 wherein said additive is sewage sludge treated with an aqueous alkali solution.

4. A water base alkaline drilling fluid according to claim 2 wherein said sewage sludge is oxidized activated sewage sludge.

5. A water base alkaline drilling fluid according to claim 2 wherein sand is removed from said sewage sludge.

6. A water base alkaline drilling fluid according to claim 2 wherein said drilling fluid further comprises clay.

7. A water base alkaline drilling fluid comprising water, sulfonated asphalt and an amount of sewage sludge selected from the group consisting of activated sewage sludge and digested sewage sludge sufficient to improve the viscosity, gel strength and fluid loss properties of the drilling fluid, said fluid having a pH in the range of about 8.5 to 11.5.

8. In a process of drilling a well with well drilling tools, the improvement comprising circulating in said well during said drilling a water base alkaline drilling fluid comprising water and an amount of sewage sludge selected from the group consisting of activated sewage sludge and digested sewage sludge sufficient to improve the viscosity, gel strength and fluid loss properties of the driling fluid, said fluid having a pH in the range of about 8.5 to 11.5.

9. In a process of drilling a well with well drilling tools, the improvement comprising circulating in said well during said drilling a water base alkaline drilling fluid comprising water and an additive selected from the group consisting of activated sewage sludge, digested sewage sludge and derivatives thereof prepared by treating it with one of an oxidizng agent, an alkali solution, and a dilute mineral acid followed by neutralization with an alkali solution, said additive being present in an amount sufficient to improve the viscosity, gel strength and fluid loss properties of the drilling fluid, said fluid having a pH in the range of about 8.5 to 11.5.

10. The improved process according to claim 9 wherein said additive is sewage sludge treated with an aqueous alkali solution.

11. The improved process according to claim 9 wherein said sewage sludge is oxidized sewage sludge.

12. The improved process according to claim 9 wherein said drilling fluid further comprises clay.

References Cited by the Examiner

UNITED STATES PATENTS

| | | | |
|---|---|---|---|
| 2,417,307 | 3/1947 | Larsen | 252—8.5 |
| 3,028,333 | 4/1962 | Stratton | 252—8.5 |
| 3,047,493 | 7/1962 | Rosenberg | 252—8.5 |
| 3,048,538 | 8/1962 | Rosenberg et al. | 252—8.5 |

OTHER REFERENCES

Metcalf et al., American Sewerage Practice, vol. III, Third ed., pub. 1935 by McGraw-Hill Book Co., Inc., New York, pages 9, 10, 70, 71, 77, 135, 136, 674 to 676, 684, 685, 694, 695, and 697.

Rogers, Composition and Properties of Oil Well Drilling Fluids, Revised Edition, pub. 1953 by Gulf Pub. Co. of Houston, Texas, pages 311, 562, and 563.

JULIUS GREENWALD, *Primary Examiner.*